(12) United States Patent
Stedman et al.

(10) Patent No.: US 8,255,595 B2
(45) Date of Patent: *Aug. 28, 2012

(54) ENABLING ACCESS TO PERIPHERAL RESOURCES AT A PROCESSOR

(75) Inventors: Roy W. Stedman, Austin, TX (US); Andrew T. Sultenfuss, Leander, TX (US); David Loadman, Austin, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/035,413

(22) Filed: Feb. 25, 2011
(Under 37 CFR 1.47)

(65) Prior Publication Data
US 2011/0225326 A1 Sep. 15, 2011

Related U.S. Application Data

(62) Division of application No. 12/189,006, filed on Aug. 8, 2008, now Pat. No. 7,921,239.

(51) Int. Cl.
*G06F 3/00* (2006.01)
*G06F 13/12* (2006.01)

(52) U.S. Cl. ............................. 710/36; 710/62
(58) Field of Classification Search .................... 710/36, 710/62
See application file for complete search history.

(56) References Cited

U.S. PATENT DOCUMENTS

| | | | |
|---|---|---|---|
| 4,720,798 A | 1/1988 | Reed et al. | |
| 5,303,171 A | 4/1994 | Belt et al. | |
| 5,586,270 A | 12/1996 | Rotier et al. | |
| 5,644,760 A | 7/1997 | Polzin et al. | |
| 5,727,231 A | 3/1998 | Bartley et al. | |
| 5,748,912 A | 5/1998 | Lee | |
| 5,999,997 A | 12/1999 | Pipes | |
| 6,078,967 A | 6/2000 | Fulghum | |
| 6,549,968 B1 | 4/2003 | Hart | |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |
| 7,149,837 B2 | 12/2006 | Watts, Jr. et al. | |
| 7,197,584 B2 | 3/2007 | Huber | |
| 2002/0103005 A1 | 8/2002 | Watts, Jr. et al. | |
| 2003/0110306 A1 | 6/2003 | Bailis et al. | |
| 2004/0088262 A1 | 5/2004 | Boucher et al. | |
| 2004/0160435 A1 | 8/2004 | Cui et al. | |

(Continued)

FOREIGN PATENT DOCUMENTS
EP 1 460 529 A2 9/2004
(Continued)

*Primary Examiner* — Chun-Kuan Lee
*Assistant Examiner* — David Martinez
(74) *Attorney, Agent, or Firm* — Larson Newman, LLP

(57) ABSTRACT

A method of enabling access to resources includes detecting an input to access a resource of a multi-mode processing module coupled to a host processor and a control module. The method can further include detecting an operating mode of the host processor and the control module and an availability of independent peripheral resources of the multi-mode processing module. Additionally, the method can enable the multi-mode processing module in response to the detecting the operating mode and the availability of the independent peripheral resources.

20 Claims, 5 Drawing Sheets

U.S. PATENT DOCUMENTS

| | | |
|---|---|---|
| 2005/0138267 A1 | 6/2005 | Bains et al. |
| 2005/0240702 A1 | 10/2005 | Kunkel et al. |
| 2007/0094435 A1 | 4/2007 | Fry et al. |
| 2007/0213105 A1 | 9/2007 | Huber et al. |
| 2008/0004889 A1 | 1/2008 | Edwards et al. |
| 2008/0070593 A1 | 3/2008 | Altman et al. |
| 2008/0140872 A1 | 6/2008 | Wright |
| 2008/0272880 A1 | 11/2008 | Sutardja et al. |

FOREIGN PATENT DOCUMENTS

| | | |
|---|---|---|
| WO | WO 2007/004178 A1 | 1/2007 |

ENABLING ACCESS TO PERIPHERAL RESOURCES AT A PROCESSOR

CROSS-REFERENCE TO RELATED APPLICATIONS

This application is a divisional of U.S. patent application Ser. No. 12/189,006 entitled "Multi-Mode Processing Module and Method of Use," filed on Aug. 8, 2008, the disclosure of which is hereby expressly incorporated by reference in its entirety.

FIELD OF THE DISCLOSURE

This disclosure relates generally to information handling systems, and more particularly to a multi-mode processing module and method of use.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
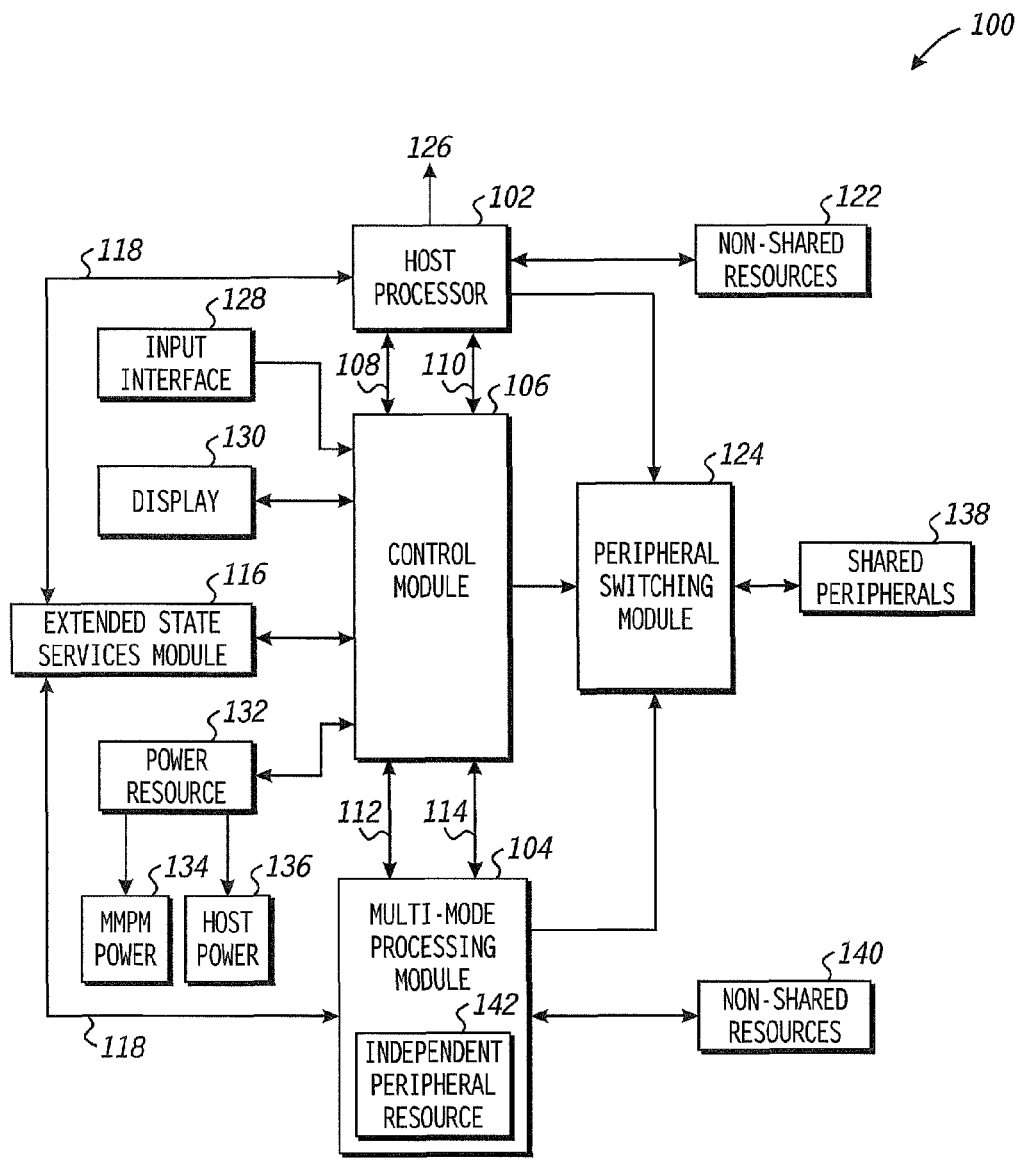
FIG. 1 illustrates a functional block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect of the disclosure, in a particular form, a multi-mode processing module can include a peripheral interface configured to be enabled in response to a peripheral application access request. The multi-mode processing module can further include a plurality of independent peripheral resources individually accessible to a host processor via the peripheral interface. The multi-mode processing module can also include a local processor configurable to enable the plurality of independent peripheral resources in response to a request by the host processor.

According to another aspect of the disclosure, a method of enabling access to resources is disclosed. The method can include detecting an input to access a resource of a multi-mode processing module coupled to a host processor and a control module. The multi-mode processing module can include a plurality of independent peripheral resources. The method can also include detecting an operating mode of the host processor and the control module, and detecting an availability of independent peripheral resources of the multi-mode processing module. The method can further include enabling the multi-mode processing module in response to the detecting the operating mode and the availability of the independent peripheral resources.

According to a further aspect of the disclosure, an information handling system is disclosed. The information handling system can include a host processor configured to access a plurality of independent resources as peripheral devices during a run-time operating mode of the host processor. The information handling system can further include a multi-mode processing module operable as the peripheral devices during the run-time operating mode of the host processor. In a particular form, the multi-mode processing module can include a peripheral interface configured to be enabled in response to a peripheral device access request of the host processor. The multi-mode processing module can further include a local processor configured to be enabled using the plurality of independent peripheral resources in response to the peripheral device access request of the host processor. The plurality of independent peripheral resources can be individually accessible to the host processor via the peripheral interface. The local processor can be further configured to process an application to enable the multi-mode processing module as a peripheral device.

FIG. 1 illustrates a functional block diagram of an information handling system according to an aspect of the disclosure. The information handling system, generally depicted at 100, can include a host processor 102 that can include a host CPU, a host CPU chipset, memory, a host operating system and various other resources and components which can be combined to form an information handling system (not illustrated). The host processor 102 can also include BIOS (not illustrated) operable to enable resources accessible to the host processor 102. The information handling system 100 can also include a multi-mode processing module (MMPM) 104, that can include a CPU, a CPU chipset, memory, and an operating system (not illustrated). The MMPM 104 can also include a second BIOS (not illustrated) operable to enable resources accessible to the MMPM 104. In an aspect, the MMPM 104 can include BIOS extensions or inputs that can be commonly used by the host processor 102.

According to an aspect, the host processor 102 and the MMPM 104 can be coupled to a control module 106. For example, the host processor 102 can be coupled to the control module 106 using a bus 108 and a bus 110. In one form, the bus 108 can include a low pin count (LPC) bus and the bus 110 can include a system management bus (SMBUS). Other types of busses can also be employed. Additionally, the MMPM 104 can be coupled to the control module 106 using a bus 112 and a bus 114. In one form buses 108, 110, 112, 114 can include any combination of a personal system 2 (PS2) bus, an RS232 bus, a serial peripheral interface (SPI bus), SMBUS, LPC, or other types of buses, or any combination thereof.

The information handling system 100 can also include an extended state services module 116 operable to couple the host processor 102 and the MMPM 104 using a peripheral interconnect 118. According to an aspect, the peripheral interconnect 118 can include a peripheral enabled communication bus, such as a universal serial bus (USB), USB 3, PCI bus, base controller (BC) bus, a PCI express (PCIE) bus, Firewire®, Gigabit Ethernet, secure digital input output (SDIO), systems management (SM), a display bus, various other types of buses, or any combination thereof, that can be employed to connect the host processor 102 to the MMPM 104 as a peripheral device. According to an aspect, the extended state services module 116 can be configured within the control module 106. In other forms, the control module 106 can be configured as a part of the MMPM 104.

The host processor 102 can also be coupled to non-shared resources 122 and a peripheral switching module 124. The multi-mode processing module 102 can be coupled to non-shared resources 126 and the peripheral switching module 124. According to an aspect, the non-shared resources 122 can include local resources that can be local to the host processor 104. Additionally, the non-shared resources 122 can be accessed on a limited basis by the MMPM 104. Additionally, the MMPM 104 can include the non-shared resources 140 local to the MMPM 104 that can be accessed by the host processor 102. According to an aspect, the control module 106 can maintain a listing of the non-shared resources 122 and 140 of each of the host processor 102 and the MMPM 104, and can further enable and disable access to each resource.

The control module 106 can also be coupled to an input interface 128 that can be coupled to any combination of, a keyboard, pointing device, touchpad, security module, etc. The control module 106 can also be coupled to a display 130 such as flat screen or flat panel display, touch screen, or any combination thereof. According to an aspect, the display can include a backlight and ambient light sensing (ALS) capabilities. The control module 106 can further be coupled to a power resource 132 operable to power the MMPM 104 using multi-mode processing module (MMPM) power 134 and to output power to the host processor 104 and associated components using host power 136. Other outputs of the power resource 132 can also be used or enabled. The peripheral switching module 124 can further be coupled to one or more shared peripherals 138 accessible to the MMPM 104 and the host processor 104.

According to a particular aspect, the information handling system 100 can enable the MMPM 104 as a peripheral device accessible to the host processor 102 or other components of the information handling system 100. For example, the host processor 102 can be operated in a run-time operating mode, and can further access one or a combination of independent peripheral resources of the MMPM 104 as peripheral resource or device. For example, the host processor 102 can offload processing to the MMPM 104 by using the MMPM 104 as a peripheral device. The control module 106 can detect an operating condition of the host processor 102 and the MMPM 104. For example, a status listing that includes an operating status of various components of the information handling system 100 can be maintained by the control module 106 and accessed as needed or desired. The control module 106 can further initiate enabling the MMPM 104 as a peripheral resource or device to the host processor 102. Additionally, the control module 106 can maintain a listing of available services, peripheral applications, or other resources that can be accessed by the host processor 102 as a peripheral device or application. For example, as the host processor 102 initiates access the MMPM 104, the extended services module 116 can be used in association with enabling access to resources of the MMPM 104. In a particular form, the extended state services module 116 can be used as a USB enabled module that can be accessed when a USB communication link can be established between the host processor 102 and the MMPM 104. Other types of communication and modules can also be used.

According to an aspect, various peripheral devices or applications the MMPM 104 can be enabled as an independent peripheral resource. For example, the MMPM 104 can include an independent peripheral resource (IPR) 142 that can be used to enable PC radio emulations, transcoders, encryption applications, GPS applications, biometric applications, camera applications, USB concentrator applications, Voice-Over-Internet Protocol (VoIP) applications, persistent hardware assisted virtual management, wake events, system management applications, various other peripheral resource applications and devices, or any combination thereof. In various fauns, the MMPM 104 can employ applications, devices, modules, or any combination thereof as an independent peripheral resource that can be accessed, by the host processor 102 as peripheral devices. Upon the host processor 102 finishing use or access to the independent peripheral resource of the MMPM 104, the control module 106 can disable the communication link 118 between the host processor 102 and the MMPM 104, and disable use of the resource as a peripheral resource.

According to another aspect, portions of all of the IPR 142 can be stored within various other locations of the information handling system 100. For example, the IPR 142 can be stored within the non-shared resources 140, and accessed by the MMPM 104 as needed or desired. In other fauns, the IPR 142 can be stored within a local memory of the MMPM 104, non-shared resources 140, non-shared resources 122, or various other locations with the information handling system 100. The IPR 142 can be accessed by the MMPM 104, and the MMPM 104 can execute instructions to enable the IPR 142 to enable access as a peripheral to the host processor 102. As such, an application that can be used a peripheral application need not be stored within the MMPM 104 to enable the MMPM 104 as a peripheral resource, device, application, etc.

Figure 2:
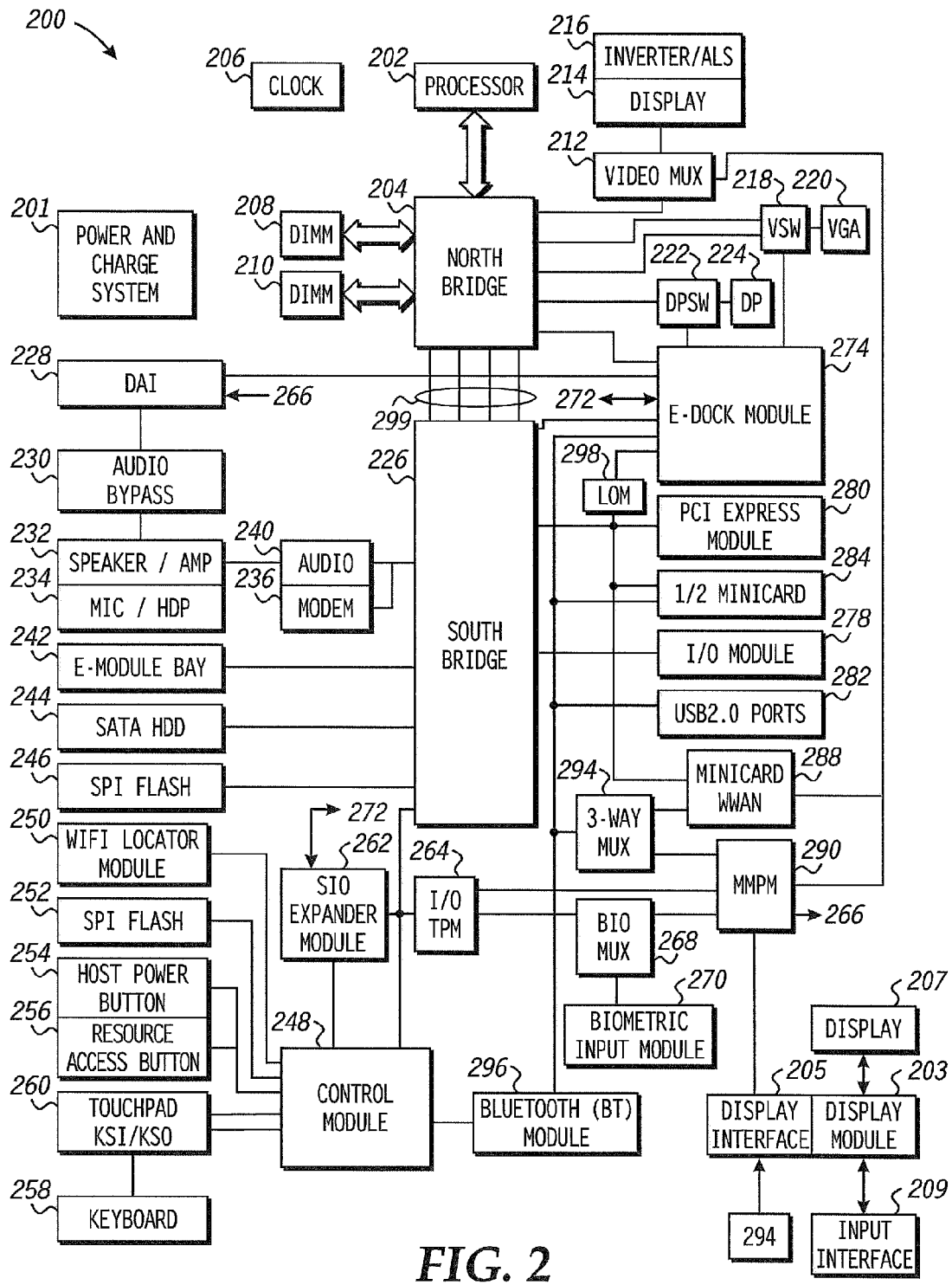
FIG. 2 illustrates a functional block diagram of an information handling system employing a multi-mode processing module according to an aspect of the disclosure.

FIG. 2 illustrates a functional block diagram of an information handling system employing a multi-mode processing module according to an aspect of the disclosure. The information handling system 200 can include a processor 202 coupled to a north bridge 204. A clock 206 can output a timing signal to the processor 202 and other components or resources of the information handling system 200 as needed or required. The north bridge 204 can be further coupled to a dual in-line memory module (DIMM) 208 and a DIMM 210. The north bridge 204 can also be coupled to a video multiplexer (Video MUX) 212 operable to multiplex and output video signals to be displayed using a display 214. The display 214 can include an inverter and automatic light sensor (ALS) module 216. The north bridge 204 can be further coupled to a video switch (VSW) module 218 and a video graphics array (VGA) port 220. A display port (DP) 224 can be coupled to a display port switch (DPSW) 222 operable to be coupled to the north bridge 204, and an E-Dock module 274. The E-Dock module 274 that can be used to expand resources of the information handling system 200, and in various forms, enable access to a battery or charge source, a media slice, an I/O box, a printer interface, or various other resources that can be accessed when docking the information handling system 200 to a docking module.

The information handling system 200 can also include a south bridge 226 coupled to the north bridge 204 using a data bus 299. A digital audio interface (DAI) module 228 can receive a digital audio signal from an input source 266. In an aspect, a multi-mode processing module 290 or other modules can be coupled to the DAI 228 to input a digital audio signal as the input source 266. For example, the DAI module 228 can also be coupled to an E-Dock module 274. An audio bypass 230 can be further coupled to a speaker and amplifier 232, and a microphone and headphone (MIC/HDP) 234. The south bridge 226 can also be coupled to a modem 236 such as an RJ-11 or plain old telephone system (POTS) enabled modem, and an audio output module 240 operable to couple audio output signals using the south bridge 226.

The south bridge 226 can be coupled to the E-Module bay 242 which can include a bay or cavity that can be used to enable couple and decouple resources that can access an internal bus of the information handling system 200 and can be further coupled to the south bridge 226. For example, the E-Module bay 242 can be coupled to the south bridge 226 using a multiplexer such as 3-way Mux 294 operable to couple a resource coupled to E-Module bay 242. Examples of resources can include disk drives, optical drives, batteries, I/O expander modules, smart card readers, and various combinations thereof. The information handling system 200 further includes a serial advanced technology attachment hard disk drive (SATA HDD) 244, and a serial peripheral interface (SPI) flash memory 246. The south bridge 226 can also be coupled to a control module 248. The control module 248 can be coupled to a wireless fidelity (WIFI) locator module 250 which can refer to any type of 802.11x or any other short-range wireless communication. The control module 248 can also be coupled to an SPI flash module 252, a host power button 254, and a resource access button interface 256 that can include one or more resource access buttons. The control module 248 can also be coupled to a keyboard 258 and touchpad and KSI/KSO module 260. An SIO expander module 262 can also be coupled to the control module 248 and can further be coupled to an I/O trusted platform module (TPM) 264. The I/O TPM 264 can further be coupled to a biometric multiplexer (BIO MUX) 268, and a biometric input 270 operable to detect user biometrics, (e.g. fingerprints, face recognition, iris detection, EKG/hear monitoring, etc.). In a form, a security engine (not illustrated) that can be coupled to the biometric inputs using the MMPM 290 that can enable and disable access to portions or all of the information handling system 200.

According to an aspect, the E-Dock module 274 can also be coupled to the control module 248 and SIO expander module 262 via interface 272. The south bridge 226 can further be coupled to an I/O module 278, a peripheral computer interconnect (PCI) express module 280 using a PCI express bus. The south bridge 226 can further be coupled to universal serial bus (USB) 2.0 access ports 282 via a host USB bus. A ½ Mini Card module 284 and a Minicard wireless wide area network (WWAN) module 288 can also be coupled to the south bridge 226 using a PCI express bus.

The information handling system 200 can further include the multi-mode processing module (MMPM) 290 operable to be coupled to a display 292. MMPM 290 can be realized as MMPM 104 described in FIG. 1, MMPM 400 described in FIG. 4, MMPM 502 described in FIG. 5, or any other module operable as needed or desired. MMPM 290 can further be configured to output a video signal to the video MUX 212 to output to the display 214. The MMPM 290 can also be coupled to a three (3) way multiplexer 294. The three (3) way multiplexer 294 can multiplex USB signals of the Minicard WWAN 288, the MMPM 290, and the USB bus coupled to the south bridge 204. The south bridge 226 can further be coupled to a Bluetooth (BT) module 296 via the USB bus. The south bridge 226 can also be coupled to a local area network (LAN) on Motherboard (LOM) 298 via a PCI express bus of the information handling system 200. The LOM 298 can also be coupled to the PCI express module 280. The information handling system 200 also includes a power and charge system 201 operable to distribute power to each component of the information handling system 200, and charge rechargeable power sources of the information handling system 200.

According to a further aspect, the MMPM 290 can be coupled to a display interface 205, display module 203 and a display 207. The display interface 205 can further be coupled to the three (3) way MUX 294. The display module 203 can further be coupled to an input interface 209 that can include an array of inputs. According to an aspect, the input interface 209 can include a touch screen interface and controller coupled to the display module 203 and display 207.

According to an aspect, the Minicard WWAN 288 and the MMPM 290 can be realized as the same module or device and can be coupled to the information handling system 200 using a Minicard WWAN enabled interface.

During operation, MMPM 290 can be configured to detect a user initiated event, a non-user initiated event, network events, clock events, location events, timer events, power events, or any combination thereof. For example, a user initiated event can include a user activating a key, button, or other type of hardware, software, or user selectable interface, or combinations thereof, that can generate a user activated event. For example, a user can select a button to access a messaging application of the information handling system 200. As such, the MMPM 290 can detect a request to access the messaging application and the MMPM 290 can initiate access to resource of the information handling system 200 during a reduced operating state of the information handling system 200.

According to another aspect, the MMPM 290 can detect a non-user initiated event. For example, the information handling system 200 can employ the Minicard WWAN 288 operable to receive communication signals via a wireless communication. The Minicard WWAN 288, coupled to the MMPM 290, can detect the non-user initiated event. For example, a software update can be received and an update can be initiated without user intervention. In another form, an auto-power off feature can be used with a GPS feature of the Minicard WWAN 288. The control module 248 or the MMPM 290 can identify a resource profile (not illustrated) of the detected event, and initiate activation of resources of the information handling system 200 to process the non-user initiated event. According to a further aspect, non-user initiated events, user initiated events, or any combination thereof can be detected.

According to an aspect, a resource profile can include a listing of resources of the information handling system 200 sufficient to process an event. The MMPM 290 and the control module 248 can initiate activation of resources based on the resource profile using the detected event, and resources available to process the event. As such, the information handling system 200 need not be initialized to process all events, and a limited amount of resources can be activated.

In another form, the information handling system 200 can detect a non-user initiated event communicated to an electronic device other than the information handling system 200 during a reduced operating state of the information handling system 200. For example, the MMPM 290 can be configured to detect a message formatted to be received by a smart phone device, Blackberry device, or any type of electronic device configured to receive messages. For example, the information handling system 200 employing the Minicard WWAN 288 operable to detect wireless messages communicated via any network operable to communicate messages. For example, a wireless messaging network such as an SMS network, Blackberry enabled network, or any other type of messaging enabled wireless or wireline network. In another form, the MMPM 290 can be wirelessly enabled to receive and transmit wireless communication signals. As such, the Minicard WWAN 288 may not be enabled to receive wireless communications.

In an exemplary form, the information handling system 200 can be operating in a low-power operating state that can include sufficient resources to detect a wireless signal. As such, the MMPM 290 can determine a current operating state of the information handling system 200, and can initiate enabling resources to process and output a response to the received wireless signal. As such, an operating environment to output a response to a message, such as a Blackberry message, can be enabled using a limited amount of resources without having to initialize additional resources of the information handling system 200. For example, the MMPM 290 in combination with the control module 248 can be used to enable access to the display 214 to output a received message. Additionally, the keyboard 258 or other input devices of the information handling system 200 can be powered to enable a user to view and respond to a message. As such, a limited resource operating environment can be generated to enable receipt and response to messages without having to initialize the information handling system 200. In this manner, the information handling system 200 can be realized as a laptop or notebook system that can be used to receive messages that may be intended for a Blackberry or other type of messaging device, thereby allowing a user to view messages using a larger display relative to the Blackberry device or smart phone device, and draft and respond to messages using the keyboard 258 and the display 214 as desired.

According to a particular aspect, the information handling system 200 can enable the MMPM 290 as a peripheral device accessible to the processor 202 or other components of the information handling system 200. For example, the processor 202 can be operated in a run-time operating mode, and can further access one or a combination of independent peripheral resources (not illustrated) of the MMPM 290 as peripheral resource or device. For example, the processor 202 can off-load processing to the MMPM 290 by using the MMPM 290 as a peripheral device. Various peripheral devices or applications the MMPM 290 can be enabled and can include PC radio emulations, transcoders, encryption applications, GPS applications, biometric applications, camera applications, USB concentrator applications, VoIP applications, persistent hardware assisted virtual management, wake events, system management applications, security applications, software update applications, virus detection applications, or various other peripheral resource applications and devices, or any combination thereof. In various forms, the MMPM 290 can employ applications, devices, modules, or any combination thereof as a peripheral resource.

Figure 3:
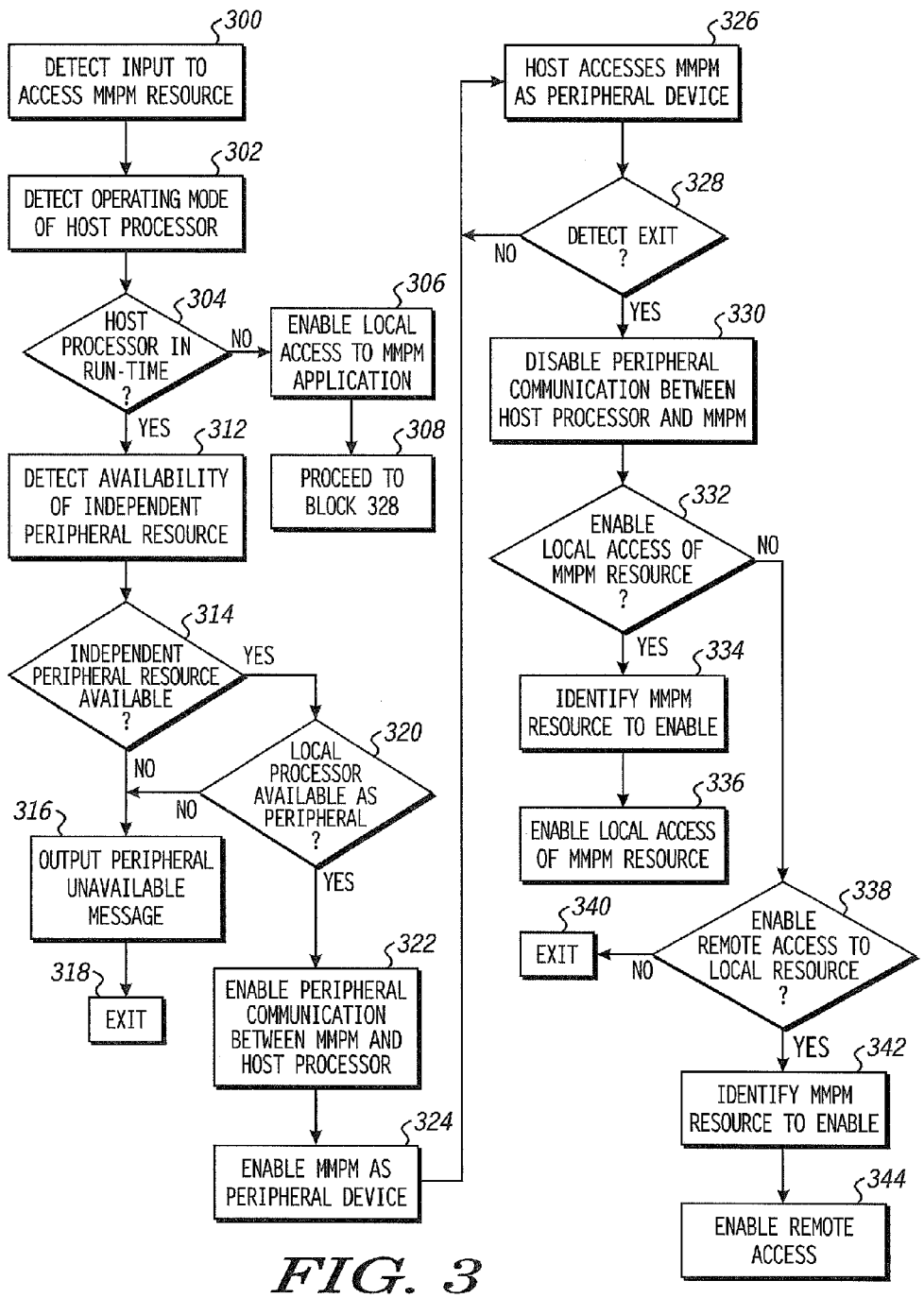
FIG. 3 illustrates a flow diagram of a method of accessing resources of an information handling system according to an aspect of the disclosure.

FIG. 3 illustrates a flow diagram of a method of a method of accessing resources of an information handling system according to an aspect of the disclosure. FIG. 3 can be employed in whole, or in part, by the information handling system 100 depicted in FIG. 1, the information handling system 200 described in FIG. 2, the MMPM 400 described in FIG. 4, the information handling system 500 illustrated in FIG. 5, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, logic, or any combination thereof, operable to provide all, or portions, of the method of FIG. 3.

The method begins at block 300 as an input to access a resource of a multi-mode processing module (MMPM), such as MMPM 104 described in FIG. 1, the MMPM 290 described in FIG. 2, or various other MMPMs may be detected. In one form, a control module can detect an input to access an MMPM resource. The method can then proceed to block 302, and detects an operating mode of the host processor, host system, or any combination thereof. For example, the host system can be placed in a low resource utilization operating mode. In other forms, the host system can be in a nm-time operating mode. Various other operating modes can also be detected. Upon detecting an operating mode of the host processor, the method can proceed to block 304 and detects whether a host processor, host system, or any combination thereof, may be in a run-time operating mode. If a run-time operating mode is not detected, the method can proceed to block 306, and local access to the requested MMPM resource or application can be enabled. For example, the MMPM application can be executed by a local processor of the MMPM. The method can then proceed to block 308 and block 328 as described below.

If at decision block 304, the host processor may be in a nm-time operating mode, the method can proceed to block 312, and the availability of an independent peripheral resource can be detected. For example, an MMPM can include various resources, such as a PC radio emulations, transcoders, encryption applications, GPS applications, biometric applications, camera applications, USB concentrator applications, VoIP applications, persistent hardware assisted virtual management, wake events, system management applications, various other peripheral resource applications and devices, or any combination thereof. In various forms, the MMPM 290 can be used to employ applications, devices, modules, or any combination thereof as a peripheral resource that can be independently accessed by the host processor as a peripheral device. As such, the MMPM can enable a resource as a peripheral device. The method can then proceed to decision block 314 and detects whether an independent peripheral resource may be available. For example, an MMPM may not have a specific peripheral device or application being requested by the host system. As such, if the independent peripheral resource is not available, the method can proceed to block 316 and a message can be output indicating that a peripheral resource may be unavailable. The method can then proceed to block 318 and exits.

If at decision block 320, a local processor may be available to enable a peripheral resource, the method can proceed to block 322, and a peripheral communication link between the MMPM and the host processor can be enabled. The method can then proceed to block 324, and the MMPM can be enabled as the requested peripheral device. The method can then proceed to block 326 and the host can access the peripheral device and any additional resources enabled in association with the enabling the peripheral device.

Upon the host accessing the MMPM as a peripheral device, the method can proceed to block 328 and detects whether an exit request has been input. If an exit request cannot be detected, the method can proceed to block 326 and repeats. If at decision block 328, a request to exit the peripheral device application can be detected, the method can proceed to block 330. At block 330, the peripheral communication link between the host processor and the MMPM can be disabled. The method can then proceed to decision block 332 and detects whether to enable local access of an MMPM resource to the local processor of the MMPM. If local access should be enabled, the method can proceed to block 334 and identifies an MMPM resource to enable. The method can then proceed to block 336, and the MMPM resource can be enabled.

If at decision block 332, local access to an MMPM resource should not be enabled, the method can proceed to decision block 338, and remote access to local resource can be detected to be enabled. For example, a local resource of the MMPM can be accessed by the host system. As such, the host processor can access resources accessible to the MMPM as local resources. If at decision block 338, remote access to the MMPM local resources may not be accessed, the method can proceed to block 340 and exits. If at decision block 338, a local resource of the MMPM should be accessed, the method can proceed to block 342 and the MMPM resource can be identified. The method can then proceed to block 344, and remote access to the MMPM resource can be enabled. For example, non-shared resources 140 of MMPM 104 illustrated in FIG. 1 can be accessed and used by the host processor 102 when the MMPM 104 may not be in a run-time operating mode. As such, the host processor 102 can expand access to non-shared resources, and independent peripheral resources of the MMPM 104.

Figure 4:
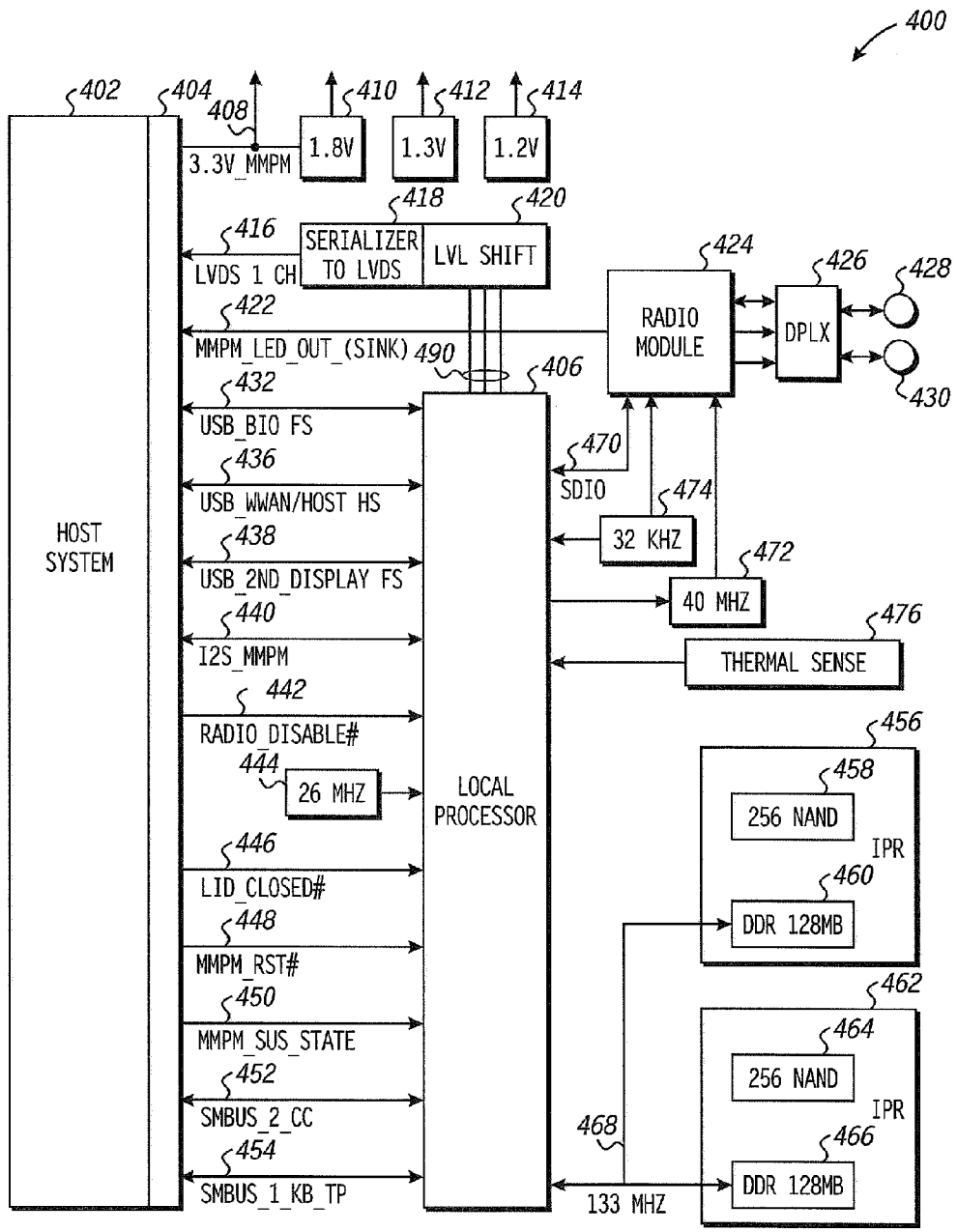
FIG. 4 illustrates a functional block diagram of a multi-mode processing module accessible to a host system according to an aspect of the disclosure.

FIG. 4 illustrates a functional block diagram of a multi-mode processing module (MMPM) 400 operable to be coupled to a host system 402 according to an aspect of the disclosure. The MMPM 400 can include an interface 404 configured to be coupled to a host system 402. According to an aspect, the interface 404 can include a Minicard enabled interface. In a form, the MMPM 400 can include the MMPM 104 described in FIG. 1, the MMPM 290 described in FIG. 2, or any other module that can be coupled to a host interface 402 to enable access to an information handling system as a peripheral device as described.

According to an aspect, the MMPM 400 can include a local processor 406 such as a TI OMAP 2430, 3430, Nvidia AP10, AP15, Motorola I.MX 32, 51, or any other processor that can be used as a processor within the MMPM 400. The MMPM 400 can also include a 3.3 Volt input signal 408 coupled input from the host system 402 via the interface 404. The 3.3 Volt input signal can be used to generate a 1.8 Volt signal 410, a 1.3 Volt signal 412, and a 1.2 Volt signal 414 to power various components of the MMPM 400.

According to a further aspect, the Interface 404 can output a low voltage display signal ("LVDS 1CH") 416 output via a serializer-to-LVDS module 418 and a level (LVL) shift module 420. For example, the serializer to LVDS module and LVL shift module 420 can be operable to convert signals from a parallel type input 490 coupled to the LVL shift 420, to a serialized output using the serializer-to-LVDS module 418. Although described as an LVDS 1 CH signal, an LVDS 2 CH signal, or any combination thereof can be output. According to another aspect, a display port, a high definition media interface (HDMI) enabled port, or any combination thereof can be also used, and signals output can be converted as needed or desired. The LVL shift module 420 can be coupled to the local processor 406 via a data bus 490. The interface 404 can further include a radio synch signal ("MMPM_LED_OUT (Sink)") 422 output by a radio module 424. The radio module 424 can be configured as a WIFI (e.g. B, G, etc.) radio and can be coupled to a duplex module 426 operable to receive signals from a first antenna 428 and a second antenna 430. The radio module 424 can be integrated as a part of the local processor 406, or in other forms can accessed as a resource of the local processor 406. According to a further aspect, the duplex module 426 can be configured to duplex signals of the antenna 428 and the antenna 430. For example, each antenna 428 and 430 and can be activated and deactivated independently or in combination, and used via the radio module 424 in response to an operating condition of the local processor 406 and a desired signal to be sent or received.

The Interface 404 can also include a USB link operable to communicate a USB bio signal ("USB_BIO FS") 432 between the interface 404 and the local processor 406. The interface 404 can also be used to couple a WWAN—Host signal ("USB_WWAN/HOST HS") 436 to the local processor 406 using a USB link. The interface 404 can also be used to couple a secondary display signal ("USB_2nd_display FS") 438 to the local processor 406 using a USB link.

The interface 404 can also be used to couple an I$^2$S enabled signal ("I2S_MMPM") 440 to the local processor 406. The interface 404 can also be used to couple a radio disable input signal ("Radio_disable#") 142 to the local processor 406. The local processor 406 can receive a twenty-six megahertz clock signal 444 from a local crystal or other clocking device. The interface 404 can also couple additional signals to the local processor 406 that can include a reset signal ("MMPM_RST#") 448 can be used to reset the module 400, components within, or any combination thereof. The MMPM_RST# signal 448 can also be used to reset the host system 402, and components thereof. The MMPM_RST # signal 448 can be enabled as a shared signal or as a non-shared signal accessible by the host system 402, the local processor 406, or any combination thereof. A "MMPM_SUS_State" signal 450 can include a suspend signal to alter a state of the MMPM 400 and can be used to enable or recover from a suspend state. For example, the MMPM 400 can be placed in a suspend state and recoverable using the MMPM_SYS_State signal 450. In another farm, the MMPM_SYS_State 450 signal can be used to enable the host system 402 or components thereof. The MMPM_SYS State 450 can be enabled as a shared signal or as a non-shared signal accessible by the host system 402, the local processor 406, or any combination thereof.

According to a further aspect, the interface 404 can include a "SMBUS_2_CC" signal 452 that can be used as a command control bus operable to couple control information between the host system 402 and the local processor 406. The SMBS_2_CC signal 452 can be used to control audio volume, LCD brightness, etc. of the host processor 402. The interface 404 can also include a "SMBUS_1_KB_TP" signal 454 operable to be couple keyboard touchpad interface signals that can be read by a controller of a keyboard, touchpad, etc. and converted and coupled to the local processor 406.

According to a further aspect, the local processor 406 can access an independent peripheral resource IPR 456 that can include 256K NAND memory 458 and 128 MB of DDR memory 460. The local processor 406 can also be coupled to an IPR 462 including 256K NAND memory 464 and 128 MB of DDR memory 466. Other memory sizes can also be used. Each MCP 456 and 462 can be coupled to the local processor 406 using a 133 MHz data bus 468.

According to a further aspect, the local processor 406 can also be coupled to the radio module 424 using an SDIO bus 470. The local processor 406 can further output a 40 MHz clock signal 472 that can be coupled to the radio module 424. A 32 KHz signal 474 can further also be coupled to the radio module 424 and the local processor 406 to synchronize signal timing. A thermal sense input 476 can also be coupled to the local processor 406 to monitor operating temperature of the MMPM 400.

According to a particular aspect, the local processor 406 can be used to output a video output signal to be displayed using an external display of the host system 402. For example, the local processor 406 can format a video output and output a video output signal using the secondary display signal 438. As such, the secondary display signal 438 can couple the video output signal to the host system 402 to be displayed using an external display. In this manner, the local processor 406 can be used during a reduced operating state of the host system 402 to output video using a second display as desired.

According to another aspect, the local processor 406 can receive an input from an input interface of a display module such as the display 209 illustrated in FIG. 2. The local processor 406 can also detect a selection and can access a function, such as an email, calendar, contacts, etc. application accessible to the local processor 406. For example, various applications can be stored within IPR 456, IPR 462, or any combination thereof. For example, various applications or peripheral sources can include PC radio emulations, transcoders, encryption applications, GPS applications, biometric applications, camera applications, USB concentrator applications, Voice-Over-Internet Protocol (VoIP) applications, persistent hardware assisted virtual management, wake events, system management applications, one or more operating systems, file systems, various other peripheral resource applications and devices, patches, virus scanning software, security applications, or any combination thereof.

The local processor 406 can also incorporate the IPR 456, the IPR 462, or any combination thereof. The local processor 406 can also detect when the lid of the host system 402 is opened or closed using the lid status ("LID_closed #") 446. For example, the host system 402 can include a laptop or other portable system that includes a lid with a display integrated along an internal portion. As the lid is opened, the host system 402 can couple an input using lid status 446 to the local processor 406, and the remote processor can couple a video output signal to be output using the LVDS 1CH signal 416. As a user closes the lid, a signal can be coupled to the lid status 446 indicating that the lid has been closed. The local processor 406 can couple a video output signal to the second display signal 438. In this manner, a second display, such as an external display provided along an external portion of the housing of the host system 402 can output a video output signal as the lid is closed.

According to a further aspect, the host system 402 can access resources of the MMPM 400 as a peripheral device. For example, the host system 402 can access resources of the MMPM 400 and offload processing, expand functionality, augment or complement features of the host system 402. During a run-time operating environment of the host system 402, the host system 402 can be coupled to the MMPM 400 using a peripheral communication bus such as a USB BIOS FS (full speed) signal 432 operable to be enabled during a peripheral operating mode of the MMPM 400. For example, a digital camera (not illustrated) can be coupled to the local processor 406 and enabled via the local processor as a peripheral device using the USB BIOS FS 432. As such, the host system 402 can access resources of the MMPM 400 as one, or a combination of, peripheral devices.

According to another aspect, the MMPM 400 can be used as a separate or auxiliary system to the host system 402 when the host system 402 may be operated in a reduced resource operating mode. For example, a user may desire to access an MMPM 400 resource when the host system 402 may be in a reduced operating mode. As such, the MMPM 400 can be enabled and the local processor 406 can access and enable resources of the MMPM 400 without having to initialize the host system 402 to a run-state operating mode.

Figure 5:
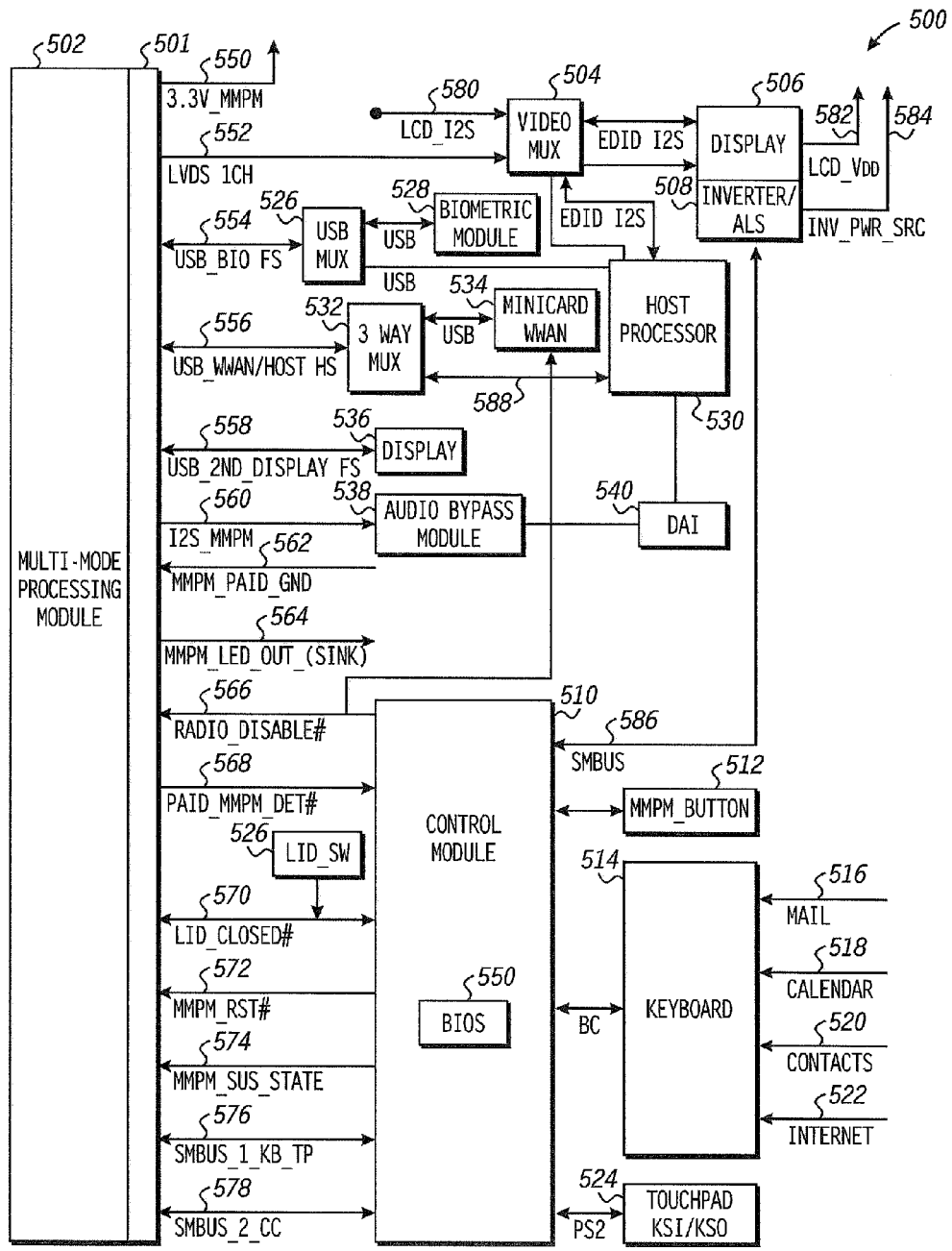
FIG. 5 illustrates a functional block diagram of a host system and interface operable to access a multi-mode processing module according to an aspect of the disclosure.

FIG. 5 illustrates a functional block diagram of a host system and interface operable to access a multi-mode processing module according to an aspect of the disclosure. An information handling system 500 can employ a host interface 501 configurable to be coupled to a multi-mode processing module 502 according to an aspect of the disclosure. The multi-mode processing module 502 can include the MMPM 104 described in FIG. 1, MMPM 290 described in FIG. 2, MMPM 400 described in FIG. 4, or any other module that can be coupled to a host interface 402 and accessible to the information handling system 500.

According to an aspect, the host interface 501 can be coupled to a video multiplexer 504 operable to multiplex and output a single channel low voltage display signal (LVDS 1 CH) output by the multi-mode processing module 502 to be displayed using the display 506 or another display.

The information handling system 500 can also include a control module 510 that can include a BIOS 550 operable to be used to initiate various resources of the information handling system 500. The inverter and ALS module 508 can be coupled to the control module 510 via an SMBUS. The control module 510 can also be coupled to a MMPM power button 512 operable to initiate a remote processor operating mode of the information handling system 500 using the MMPM 502. The control module 510 can also be coupled to a keyboard 514 that can include a QWERTY keyboard having a mail button 516, a calendar button 518, a contacts button 520, and an Internet access button 522. Each button 516, 518, 520, and 522, alone or in combination, can be configured as a separate module or a part of another portion of the information handling system 500. The keyboard 514 can also include various other types of function keys as needed or desired. According to an aspect, the display 536 can be a touch screen enabled display and can couple an input to the control module 510.

The information handling system 500 can also include a USB MUX 526 coupled to a biometric module 528 operable to input biometrics of a user. The USB MUX 526 can further be coupled to a host processor 530 of the information handling system 500, and the host interface 501.

In another embodiment, a "LCD_I2S" signal can be coupled directly to the MMPM 502 and can be selectively enabled by the MMPM module 502 and can be used to identify a type of display installed. For example, a display classification can be determined and read using the LCD_I2S input 580. As such, an video output format can be determined to be output to the display 506. The video MUX 504 couples the multiplexed signal to the display 506 powered by a display power source ("LCD_Vdd") 582. The display 506 includes an inverter and ALS module 508 powered by an inverter power source ("INV_PWR_SRC") 584.

The control module 510 can also be coupled to a touchpad 524 that enables use of a pointer or pointing device that can be displayed on the display 506. The control module 510 can also be coupled to a lid switch ("LID_SW") input 526 operable to alter a signal when a lid or display of the information handling system 500, other type of mobile information handling system, may be opened or closed.

According to a further aspect, the host interface 501 can also include the audio bypass ("I2S_BLT") input 538 coupled to an audio bypass module 538. The audio bypass module 538 can be coupled to a digital audio interface (DAI) module 540 via an I²S bus. The DAI module 540 can further be coupled to the host processor 530 via the I²S bus.

According another aspect, the host interface 501 can also include various other inputs, outputs, or combinations thereof. For example, the host interface 501 can include a voltage source input ("3.3V_MMPM") 550, a USB enabled biometric link ("USB_BIO FS") 554, a USB enabled WWAN and host system link ("USB_WWAN/HOST HS") 556, a USB enabled second display link ("USB_2nd Display FS") 558, a I²S ("I2S_MMPM") input 560, a ground input ("MMPM_PAID_GND") 562, and an RPI LED ("MMPM_LED_Out_(Sink)") output 564.

The host interface 501 can also include a radio disable ("Radio_disable #") input 566, a paid detection ("PAID_M-MPM_DET#") input 568, a MMPM reset ("MMPM_RST#") input 572, a MMPM sustain state ("BLT_SUS_State") input 574, a SMBUS keyboard enable ("SMBUS_1_KB_TP") link 576, and an SMBUS 2 CC ("SMBUS_2_CC") link 578.

According to a further aspect, the WWAN access ("USB_WWAN/HOST HS") link 556 can be coupled to a three (3) way MUX 532. The Minicard WWAN 534 can be configured to be coupled to the host processor 530 using a USB enabled bus. The MMPM 502 can also be coupled a display 536 using display ("USB_second display") link 558.

According to another aspect, the MMPM 502 can output a video output signal using the LVDS 1CH signal 552. Additionally, the video output signal can be coupled to the video multiplexer 504 to be displayed using the display 506. In another form, the display 506 can be placed in a non-operating mode. For example, the host processor 530 can be placed in a reduced operating state, and the display 506 can also be placed in a reduced operating state. One example can include the lid of a laptop being closed. As such, the remote processor 502 can detect the lid being closed, and couple a video output signal to the USB_2nd Display FS signal 558 to be output to the display 536. In this manner, the host processor 530 and the display can in a reduced operating state, and the multi-mode processing module can access the display 536 to output a video signal as needed.

According to a further aspect, the host system 500 can access resources of the MMPM 502 as a peripheral device. For example, the host system 500 can access resources of the MMPM 502 and offload processing, expand functionality, augment or complement features of the host system 500. During a run-time operating environment of the host system 500, the host system 500 can be coupled to the MMPM 502 using a peripheral communication bus such as USB BIOS FS 554. As such, the host system 500 can access resources of the MMPM 502 as single, or a combination of, peripheral devices.

According to another aspect, the MMPM 502 can be used as a separate or auxiliary system to the host system 500 when the host system 500 may be operated in a reduced resource or reduced-state operating mode. For example, a user may desire to access an MMPM 502 resource when the host system 500 may be in a reduced operating mode.

According to another aspect, the multi-mode processing module 502 can output a video output signal and an audio output signal during a reduced operating condition of the host processor 530. For example, the multi-mode processing module 502 can output a video output signal to the display 536, and can further output an audio signal to the audio bypass module 538 which can be activated during the reduced operating condition of the host processor 530. In other forms, the audio bypass module 538 and associated components sufficient to output audio can be enabled and disabled in response to a lid of the information handling system being opened and closed.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method implemented at an information handling system, comprising:
   enabling a peripheral interface in response to a peripheral application access request;
   enabling a plurality of independent peripheral resources in response to a request by a host processor;
   receiving at a local processor, during a run-time operating mode of the host processor, an input from an extended state services module accessible to a control module coupled to the host processor, wherein the input is received during a run-time operating mode of the host processor;
   enabling at the local processor access to an independent peripheral resource of the plurality of independent peripheral resources in response to the input; and
   disabling access to the extended state services module during a reduced operating state of the host processor.

2. The method of claim 1, further comprising:
   updating at the local processor the plurality of independent peripheral resources; and
   wherein the host processor is configurable to access the updated plurality of independent peripheral resources.

3. The method of claim 1, further comprising:
   enabling access of the host processor to the plurality of independent peripheral resources during a run-time of the host processor; and
   disabling access of the host processor to the plurality of independent peripheral resources during a reduced operating state of the host processor.

4. The method of claim 3, further comprising enabling access of the local processor to the plurality of independent peripheral resources during the reduced operating state of the host processor.

5. The method of claim 4, further comprising:
   accessing at the local processor the plurality of independent peripheral resources during a reduced operating state of the host processor; and
   disabling the peripheral interface during the reduced operating state of the host processor.

6. The method of claim 1, further comprising:
   enabling the host processor and the local processor access to shared resources;
   accessing the shared resources at the host processor during a run-time operating mode of the host processor;
   accessing the shared resources at the local processor during a run-time operating mode of the local processor; and
   disabling access to the shared resources by the host processor during the run-time operating module of the local processor.

7. The method of claim 1, further comprising:
   enabling plurality of peripheral functions in response to coupling the host processor to the peripheral interface.

8. The method of claim 7, further comprising updating a listing of peripheral functions to include an alternate peripheral function accessible to the host processor via the peripheral interface.

9. The method of claim 1, further comprising:
   receiving at the local processor an operating state listing from a control module operably coupled to the host processor; and
   enabling access to the plurality of independent peripheral resources in response to an entry within the operating state listing.

10. A method implemented at an information handling system, comprising:
    enabling a peripheral interface in response to a peripheral application access request;
    enabling a plurality of independent peripheral resources in response to a request by a host processor;
    receiving at a local processor, during a run-time operating mode of the host processor, an input from an extended state services module accessible to a control module coupled to the host processor, wherein the input is received during a run-time operating mode of the host processor;
    enabling at the local processor access to an independent peripheral resource of the plurality of independent peripheral resources in response to the input during a reduced operating state of the host processor; and
    disabling access to the extended state services module during the reduced operating state of the host processor.

11. The method of claim 10, wherein the independent peripheral resource comprises an encryption application.

12. The method of claim 10, wherein the independent peripheral resource comprises a global positioning system (GPS) application.

13. The method of claim 10, wherein the independent peripheral resource comprises a Voice-Over-Internet Protocol (VOIP) application.

14. The method of claim 10, wherein the independent peripheral resource comprises a camera application.

15. The method of claim 10, wherein the independent peripheral resource comprises a biometric application.

16. A method implemented at an information handling system, comprising:
    enabling a peripheral interface in response to a peripheral application access request;
    enabling a plurality of independent peripheral resources in response to a request by a host processor;
    receiving at a local processor, during a run-time operating mode of the host processor, an input from an extended state services module accessible to a control module coupled to the host processor, wherein the input is received during a run-time operating mode of the host processor;
    enabling at the local processor access to an independent peripheral resource of the plurality of independent peripheral resources in response to the input;
    disabling access to the extended state services module during a reduced operating state of the host processor;
    accessing at the local processor the plurality of independent peripheral resources during the reduced operating state of the host processor; and
    disabling the peripheral interface during the reduced operating state of the host processor.

17. The method of claim 16, wherein the independent peripheral resource comprises an encryption application.

18. The method of claim 16, wherein the independent peripheral resource comprises a global positioning system (GPS) application.

19. The method of claim 16, wherein the independent peripheral resource comprises a Voice-Over-Internet Protocol (VOIP) application.

20. The method of claim 16, wherein the independent peripheral resource comprises a camera application.

* * * * *